(12) United States Patent
Kubo et al.

(10) Patent No.: US 7,555,599 B2
(45) Date of Patent: Jun. 30, 2009

(54) SYSTEM AND METHOD OF MIRRORED RAID ARRAY WRITE MANAGEMENT

(75) Inventors: Robert A. Kubo, Tucson, AZ (US); Jeremy M. Pinson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 215 days.

(21) Appl. No.: 11/470,453

(22) Filed: Sep. 6, 2006

(65) Prior Publication Data
US 2008/0059699 A1 Mar. 6, 2008

(51) Int. Cl.
*G06F 12/00* (2006.01)
(52) U.S. Cl. .................. 711/114; 711/154; 711/162
(58) Field of Classification Search .............. 711/114, 711/154, 162
See application file for complete search history.

(56) References Cited

U.S. PATENT DOCUMENTS

| | | | |
|---|---|---|---|
| 6,163,773 A * | 12/2000 | Kishi | 706/16 |
| 6,195,730 B1 * | 2/2001 | West | 711/121 |
| 6,397,293 B2 | 5/2002 | Shrader et al. | |
| 6,912,643 B2 * | 6/2005 | Horn | 711/202 |
| 6,938,133 B2 | 8/2005 | Johnson et al. | |
| 2002/0103967 A1 | 8/2002 | Brower, Jr. et al. | |
| 2004/0034746 A1 * | 2/2004 | Horn et al. | 711/141 |
| 2005/0210218 A1 | 9/2005 | Hoogterp | |

* cited by examiner

*Primary Examiner*—Reba I Elmore
(74) *Attorney, Agent, or Firm*—Scully, Scott, Murphy & Presser, P.C.

(57) ABSTRACT

The write operations to the storage devices are managed so that the write operations that would force a storage device to reposition its read/write head outside its read optimization boundary are queued until a threshold is reached. Upon reaching the write queue threshold, the write operations are sent to the storage devices in a burst mode that limits the impact of storage device seek operations that force the device read/write head out of position relative to the data that is assigned as it's primary read region, keeping the read/write head in it's primary locality to optimize the performance of read operations.

17 Claims, 4 Drawing Sheets

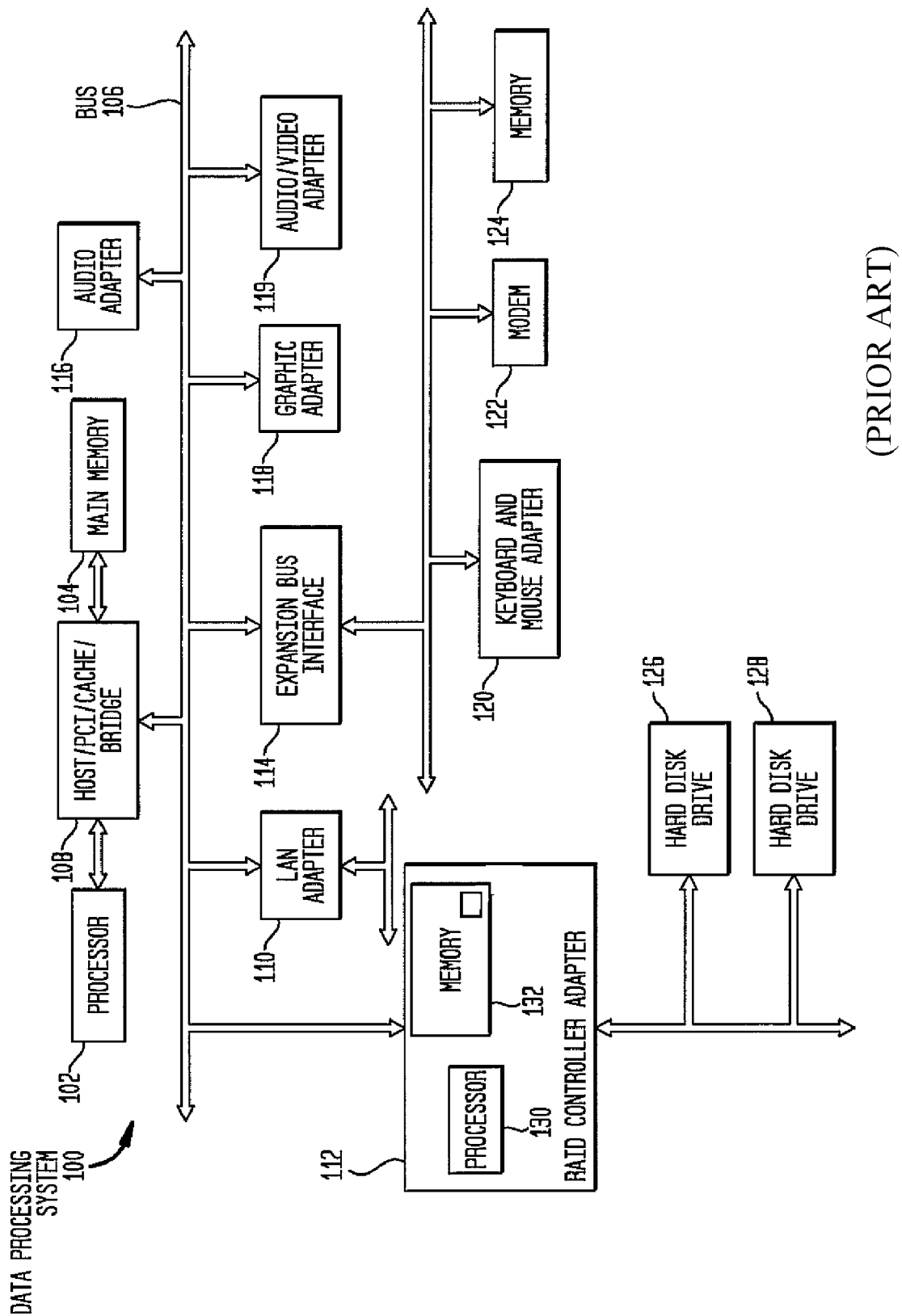

SYSTEM AND METHOD OF MIRRORED RAID ARRAY WRITE MANAGEMENT

FIELD OF THE INVENTION

The present disclosure relates to managing a mirrored RAID Array and specifically to optimizing the management of the RAID write data for improving overall performance of the mirrored devices.

BACKGROUND OF THE INVENTION

In computing, RAID (a redundant array of independent or inexpensive disks) refers to a multiple bard drive or a multiple disk drive system that shares or replicates data among the drives. RAID level 1 creates a mirrored copy of data on two disks. RAID[1] schema increases read performance since each copy can be accessed independently, allowing reads to be performed on different drives at the same time. In addition, ordinary wear-and-tear reliability is raised by the power of the number of self-contained copies. When writing, the array performs like a single disk, as all mirrors must be written with the data.

The existing technology on optimizing mirrored RAID array performance thus far has focused on read performance optimization. The present disclosure enhances the read performance optimization of known technology by adding optimization to the management of the RAID write data such that the overall performance of the mirrored devices is managed to an optimum level.

BRIEF SUMMARY OF THE INVENTION

A system and method for mirrored raid array write management is provided. The method in one aspect includes interjecting a write request to a mirrored RAID array and queuing the write request to a write queue. The method also includes determining whether the write queue has reached a selected threshold. The method further includes ordering a plurality of write requests in the write queue sequentially to map to logical block addresses of a hard disk drive and transferring the plurality of write requests to the bard disk drive at one time in a burst of transactions, if it is determined that the write queue has reached the selected threshold.

In another aspect, a method for mirrored RAID array write management includes determining if a write queue reached a threshold. If the write queue has reached a threshold, the method may include sending queued write requests in the write queue to a hard disk drive. The method may also include determining whether a write request is for a data location in a read optimized region. If the write request is for a data location in a read optimized region, the method may include sending the write request to a hard disk drive. If the write request is not for a data location in a read optimized region, the method may also include adding the write request to the write queue.

A system for mirrored RAID array write management, in one aspect, may include means for receiving a write request to a mirrored RAID array, a write queue, means for queuing the write request to the write queue, means for determining whether the write queue reached a selected threshold, means for ordering a plurality of write requests in the write queue sequentially to map to logical block addresses of a hard disk drive, and means for transferring the plurality of write requests to the hard disk drive one at a time in a burst of transactions, if the write queue has reached the selected threshold.

In another aspect, the means for queuing queues the write request if the write request is not to a data location in read optimized region. The selected threshold may include a predetermined number of write requests in one aspect. The selected threshold may include a predetermined time period in another aspect.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 1 is a block diagram illustrating an exemplary data processing system in which a preferred embodiment of the present invention may be implemented.

DETAILED DESCRIPTION

Figure 2A:
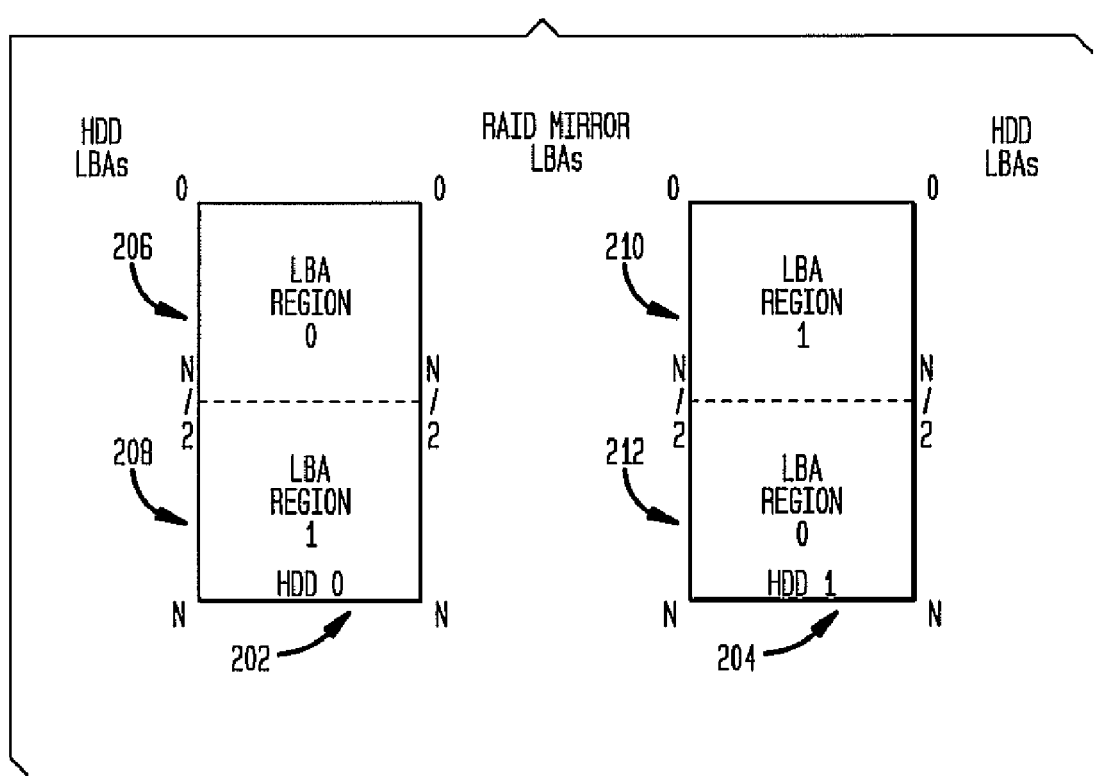
FIG. 2A illustrates a simplified data layout for a mirrored pair of devices configured in a RAID array configuration.

A system and method of minored raid array write management is provided. In an exemplary embodiment, the write operations to the storage devices are managed so that the write operations that would force a storage device to reposition its read/write head outside its read optimization boundary are queued until a threshold is reached. Upon reaching the write queue threshold, the write operations are sent to the storage devices in a burst mode that limits the impact of storage device seek operations that force the device read/write head out of position relative to the data that is assigned as its primary read region, keeping the read/write head in its primary locality to optimize the performance of read operations.

Mirrored RAID implementations may provide read optimizations by controlling physical device travel seek latencies for read requests to specific devices based on array/device LBA (logical block address). In an exemplary embodiment of the present disclosure, management of write queue and bursting of writes to each mirrored device is incorporated into such read optimized mirrored RAID implementations, for example, to enhance the optimization of write management. In one embodiment of the present disclosure, write queue management and bursting of writes is managed in conjunction with the read optimizations to control the physical device head travel and seek latencies such that read operations are optimized in appropriate regions of the disk to optimize performance. Write operations in one embodiment are queued and bursted to one device of the mirrored pair at a time in a managed order that optimizes the end position of the device read/write head.

FIG. 1 illustrates a block diagram of data processing system 100 in which a preferred embodiment of the present invention may be implemented. Data processing system 100 employs a peripheral component interconnect (PCI) local bus architecture. Although the depicted example employs a PCI bus, other bus architectures, such as Micro Channel and ISA may be used. Processor 102 and main memory 104 are connected to PCI local bus 106 through PCI bridge 108. PCI bridge 108 may also include an integrated memory controller and cache memory for processor 102. Additional connections to PCI local bus 106 may be made through direct component interconnection or through add-on boards. In the depicted example, local area network (LAN) adapter 110, RAID Controller adapter 112, and expansion bus interface 114 are connected to PCI local bus 106 by direct component connection. In contrast, audio adapter 116, graphics adapter 118, and audio/video adapter (A/V) 219 are connected to PCI local bus 106 by add-in boards inserted into expansion slots. Expansion bus interface 114 provides a connection for a keyboard and mouse adapter 120, modem 122, and additional memory 124. In the depicted example, RAID Controller Adapter 112 provides a connection for hard disk drive 126 and hard disk drive 128. Typical PCI local bus implementations will support three or four PCI expansion slots or add-in connectors.

A operating system runs on processor 102 and is used to coordinate and provide control of various components within data processing system 100 in FIG. 1. The operating system may be a commercially available operating system, such as AIX, which is available from International Business Machines Corporation. "AIX" is a trademark of International Business Machines Corporation. An object oriented programming system, such as Java, may run in conjunction with the operating system, providing calls to the operating system from Java programs or applications executing on data processing system 100. "Java" is a trademark of Sun Microsystems, Incorporated. RAID controller adapter 112 comprises a processor 130 and a memory 132 that manage the RAID relationship of hard disk drive 126 and hard disk drive 128.

Those of ordinary skill in the art will appreciate that the hardware in FIG. 1 may vary depending on the implementation. For example, other peripheral devices, such as optical disk drives and the like, may be used in addition to or in place of the hardware depicted in FIG. 1. The depicted example is not meant to imply architectural limitations with respect to the present invention. For example, a system and method of the present invention may be applied to multiprocessor data processing systems.

FIG. 2A illustrates a simplified data layout for a mirrored pair of devices configured in a RAID array configuration. The data layout is configured with the logical block address (LBA) scheme of the array and the physical device linearly mapped to each other. Both the RAID array logical and storage device physical LBAs are mapped linearly from the top to the bottom of the range of the logical and physical devices.

Known techniques enhance read performance for a mirrored RAID level, for example, RAID 1, by localizing the seek area that each device's read/write heads are required to travel to complete the read operations requested for each device. The known techniques achieve the localizing by controlling the read request operations that are sent to each device. For example, the read requests sent to a storage device are limited to a range of LBAs that provides a locality to the request such that read/write head travel is minimized.

Each storage device, for example, hard disk drive 0 (HDD0 202) and hard disk drive 1 (HDD1 204), is divided into two LBA regions, region 0 and region 1 (206, 208, 210, 212). The read request operations to each device 202, 204 are limited to orthogonal regions such that the read/write head travel is limited to a single region. For example, in one embodiment the read requests that are sent to storage device 202 are limited to those that request data located in array LBA region 0 (206) and the read requests that are sent to storage device 204 are limited to those that request data located in LBA region 1 (210). In the cited example, the optimal read performance region for storage device 202 is LBA region 0 (206) and the optimal read performance region for storage device 204 is LBA region 1 (210). By managing the storage device read/write head travel, the seek time for each operation is constrained to a small finite value.

Figure 2B:
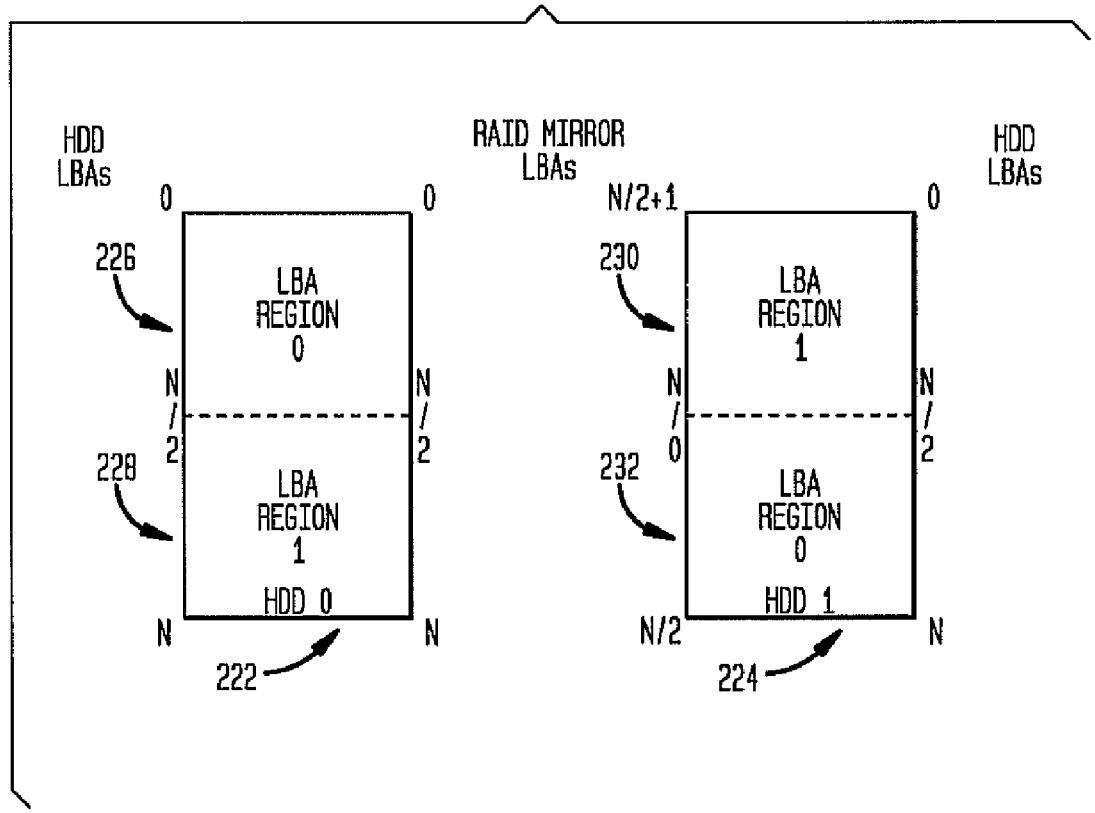
FIG. 2B illustrates an alternative logical to physical mapping of HDD data storage locations.

FIG. 2B illustrates an additional embodiment of data layout for storage devices of a mirrored. RAID level, providing different logical to physical mapping of HDD LBAs to RAID array LBAs. In FIG. 2B, the data layout mapping of HDD1 224 is shown as two separate discrete regions of LBAs that mimic the sequential order of how a user may access the LBAs in the region. Ordering the LBAs in this manner matches the movement of the read/write head of the storage device for sequential accesses within each region. In this embodiment a similar approach to read optimizations is realized by limiting the read request operations to each device 222, 224 to orthogonal LBA regions (LBA region 0 to the first device and LBA region 1 of the second device) such that read/write head travel is limited to a single region. The defined locality regions are the optimal read performance regions for each device.

In an exemplary embodiment, write operations may be optimized by gathering write requests into batches and limiting writes outside the optimal area to batch write operations. This will reduce the amount of seeking the hard disk drive needs to perform outside the optimal read performance area when writing data to disk.

An exemplary embodiment of the present disclosure uses a RAID adapter write buffer/caching behavior to gather write operations and queue them until a threshold is reached. This allows array read operations that are cache misses to pass the queued write operations and be serviced from the devices that are operating in their preferred operational regions. Read operations that are hits to the write cache are serviced from the write cache, thus ordering is preserved throughout the gathering of writes.

When the write data threshold is reached, the write operations are sequentially ordered to map to the HDD LBAs and transferred to the HDDs one at a time in a burst of transactions. Write data threshold may be determined, for example, based on the amount of data, latency, number of I/Os pending, or other attributes. In one embodiment of the present disclosure, the RAID controller transfers the write data to one HDD at a time, keeping the second HDD available to service further read operations while the write transactions are pending. The data is sent in a manner that optimizes the head travel to each storage device by controlling the order of the data transfers to the HDD in simple HDD LBA order. For example, in one embodiment of the present disclosure, the method and system may gather the write data and order the data into transfers that map the array LBA data to the HDD LBA data in sequential manner, thus making the array LBA ordering on the device independent of the write order of data transfer to both HDDs.

Figure 3:
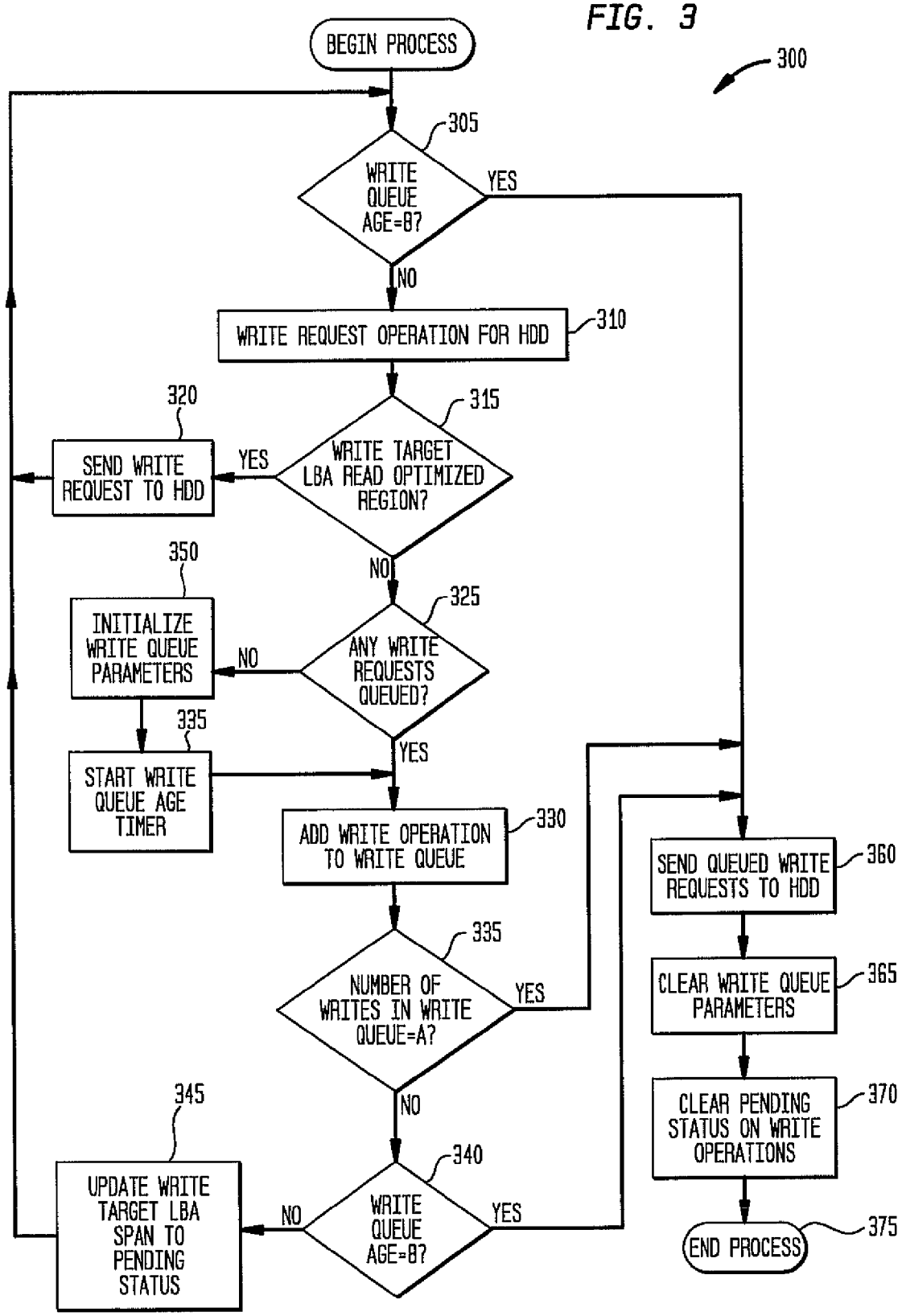
FIG. 3 is a flow diagram illustrating a method of managing mirrored RAID writes in one embodiment of the present disclosure.

FIG. 3 is a flow diagram illustrating a method of managing mirrored RAID writes in one embodiment of the present disclosure. Referring to FIG. 3, process 300 is described. In step 301 the process begins for a hard disk drive such as hard disk drive 126 (FIG. 1) that is a mirrored RAID relationship with hard disk drive 128 (FIG. 1), for example, having a data layout 202 shown in FIG. 2A. In step 305, at a periodic time interval C, an evaluation is performed to determine if the write queue age has reached an age equal to time B.

If the evaluation of step 305 determines that the write queue age has reached an age equal to time B, the process proceeds to step 360, where the write operations in the write queue are sent to the hard disk drive. Once the queued write operations have been sent to the hard disk drive 126 (FIG. 1), the process proceeds to step 365 where the write queue parameters are cleared. The process then moves on to 370 where the pending status of previously queued write operations is cleared. The process then ends at step 370.

If the evaluation of step 305 determines that the write queue age is less than time B, the process will begin a new time interval C wait. During the time interval C wait period, a write request operation 310 is received by RAID controller adapter 112 (FIG. 1) for RAID array containing hard disk drive 126 (FIG. 1) and bard disk drive 128 (FIG. 1). In step 315 an evaluation is made to determine if the write request operation is for a data location in the read optimized region 206 of hard disk drive 126 (FIG. 1). If the evaluation determines that the write request operation is for a data location in the read optimized region 206 (FIG. 2A) of hard disk drive 126 (FIG. 1), the process proceeds to step 320 and the write request is sent to hard disk drive 126 (FIG. 1) without delay. The process then returns to step 305 and evaluates the write queue age.

If the evaluation of step 315 determines that the write request operation is for a data location not located in the read optimized region 206 (FIG. 2A) of hard disk drive 126 (FIG. 1), the process proceeds to step 325. In step 325 an evaluation is made to determine if there are any queued write requests for hard disk 126 (FIG. 1). If it is determined that there are no queued write requests for hard disk 126 (FIG. 1), then the process proceeds to step 350 where the write queue monitoring parameters 'A' and 'B' are initialized. The process then proceeds to step 355 where the write queue age timer is started. The process then proceeds to step 330 where the write request operation is added to the write queue.

The process then proceeds to step 335 where an evaluation is made of how many outstanding requests are pending in the write queue. If the evaluation of step 335 determines that there are a number 'A' write operation requests queued, the process then proceeds to step 360. If the evaluation of step 335 determines that there are less than 'A' queued write operation request then the process proceeds to step 340.

In step 340 an evaluation is performed to determine if the write queue age has reached an age greater than or equal to time B. If the evaluation of step 340 determines that the write queue age has reached an age greater than or equal to time B, the process proceeds to step 360. If the evaluation of step 340 determines that the write queue age is less than time B, the process proceeds to step 345.

In step 345, the targeted data location of write request operation 310 is placed in a pending status. RAID controller adapter 112 (FIG. 1) uses this information to note what operations have not completed to both hard disk drives 126, 128 (FIG. 1) to determine when it will acknowledge to the data processing system 100 (FIG. 1) that the write operation has completed.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method of mirrored RAID array write management, comprising:
   receiving a write request to a minored RAID array;
   determining whether the write request is for writing to a read optimized region, the read optimized region being a designated LBA region in which physical movement of read/write head is limited to the designated LBA region;
   queuing the write request to a write queue if the write request is not writing to the read optimized region;
   determining whether the write queue reached a selected threshold;
   if the write queue has reached the selected threshold, ordering a plurality of write requests in the write queue sequentially to map to logical block addresses of a hard disk drive; and
   transferring the plurality of write requests to the hard disk drive one at a time in a burst of transactions,
   wherein if it is determined that the write request is for writing to the read optimized region, the write request is sent to HDD and not queued to the write queue.

2. The method of claim 1, further including:
   servicing one or more read operations that are hits to the write cache from the write cache.

3. The method of claim 1, wherein the write request is received from a RAID adapter writer buffer.

4. The method of claim 1, wherein the selected threshold is determined based on an amount of data in the write queue.

5. The method of claim 1, wherein the selected threshold is determined based on latency.

6. The method of claim 1, wherein the selected threshold is determined based on a number of I/Os pending.

7. The method of claim 1, wherein the queuing step is performed for a plurality of write requests to a region of a hard disk drive that is outside an optimal area.

8. A method for mirrored RAID array write management, comprising:
   determining if a write queue reached a threshold;
   if the write queue has reached a threshold, sending queued write requests in the write queue to a hard disk drive;
   determining whether a write request is for a data location in a read optimized region, the read optimized region being a designated LBA region in which physical movement of read/write head is limited to the designated LBA region;
   if the write request is for a data location in a read optimized region, sending the write request to a hard disk drive; and
   if the write request is not for a data location in a read optimized region, adding the write request to the write queue.

9. The method of claim 8, wherein the threshold is a predetermined number of write requests.

10. The method of claim 8, wherein the threshold is a predetermined time period.

11. The method of claim 8, further including:
    if the write request is not for a data location in read optimized region, determining whether a write queue exists; and
    if the write queue does not exist, initializing a write queue and starting write queue age timer.

12. The method of claim 11, further including:
    placing targeted data location of the write request to a pending status.

13. The method of claim 8, further including:
    placing targeted data location of the write request to a pending status.

14. A system for mirrored RAID array write management, comprising:
    means for receiving a write request to a minored RAID array;
    a write queue;
    means for determining whether the write request is for writing to a read optimized region, the read optimized region being a designated LBA region in which physical movement of read/write head is limited to the designated LBA region;
    means for queuing the write request to the write queue;
    means for determining whether the write queue reached a selected threshold;

means for ordering a plurality of write requests in the write queue sequentially to map to logical block addresses of a hard disk drive; and means for transferring the plurality of write requests to the hard disk drive one at a time in a burst of transactions, if the write queue has reached the selected threshold, wherein if it is determined that the write request is for writing to the read optimized region, the write request is sent to HDD and not queued to the write queue.

15. The system of claim 14, wherein the means for queuing queues the write request if the write request is not to a data location in read optimized region.

16. The system of claim 14, wherein the selected threshold includes a predetermined number of write requests.

17. The system of claim 14, wherein the selected threshold includes a predetermined time period.

* * * * *